No. 806,044. PATENTED NOV. 28, 1905.
H. ANDREWS.
SPEED INDICATOR.
APPLICATION FILED FEB. 8, 1905.
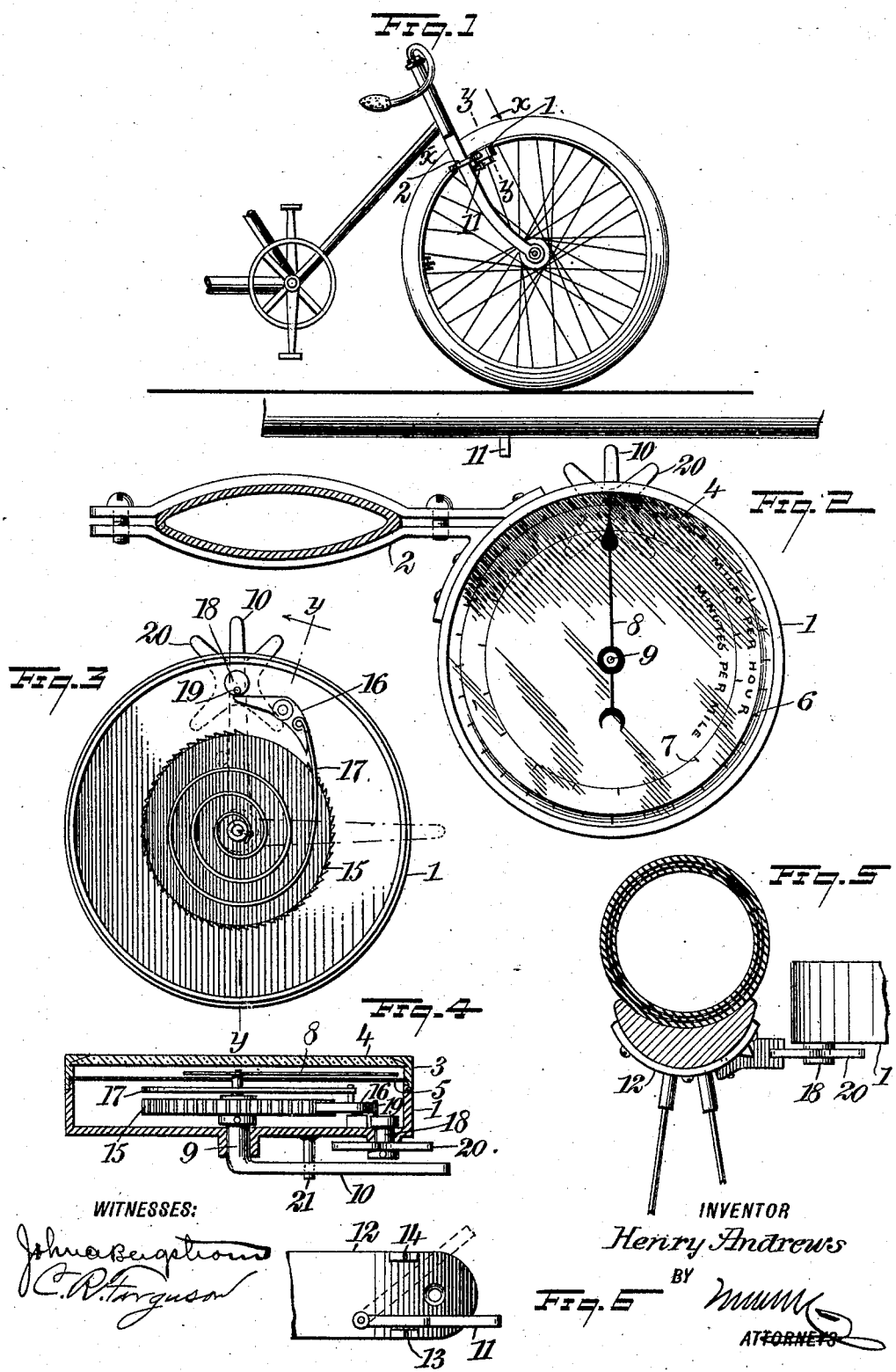
WITNESSES:
INVENTOR
Henry Andrews
BY
ATTORNEYS

UNITED STATES PATENT OFFICE.

HENRY ANDREWS, OF HOLLIS, DISTRICT OF ALASKA.

SPEED-INDICATOR.

No. 806,044.          Specification of Letters Patent.          Patented Nov. 28, 1905.

Application filed February 8, 1905. Serial No. 244,737.

*To all whom it may concern:*

Be it known that I, HENRY ANDREWS, a citizen of the United States, and a resident of Hollis, in the District of Alaska, have invented a new and Improved Speed-Indicator, of which the following is a full, clear, and exact description.

This invention relates to improvements in devices for indicating the speed of bicycles, automobiles, racing-sulkies, and other vehicles, the object being to provide a device of this character that will be simple in construction, inexpensive, and that will accurately indicate the number of miles traveled per hour and the number of minutes per mile.

I will describe a speed-indicator embodying my invention and then point out the novel features in the appended claims.

Reference is to be had to the accompanying drawings, forming a part of this specification, in which similar characters of reference indicate corresponding parts in all the figures.

Figure 1 is a side elevation of a portion of a bicycle, showing a speed-indicator embodying my invention as attached thereto. Fig. 2 is a section on the line $x$ $x$ of Fig. 1. Fig. 3 shows the interior mechanism. Fig. 4 is a section on the line $y$ $y$ of Fig. 3. Fig. 5 is a section on the line $z$ $z$ of Fig. 1, and Fig. 6 is a detail showing a tappet carried by a wheel of the vehicle to which the device is attached.

Referring to the drawings, 1 designates a casing designed to be secured to a fixed part of a vehicle. It is here shown as fixed to a front-fork member of a bicycle by means of a clamp 2. On the casing 1 is a removable cover 3, having a glass top 4, and below the top 4 is a dial 5, having an annular row of graduations 6 for indicating miles per hour and an annular row of graduations 7 for indicating the minutes per mile.

Arranged to travel over the dial 5 is a pointer 8, this pointer being attached to a spindle 9, passing through the dial 5 and also through the bottom wall of the casing 1. At the outer or lower end the spindle 9 has integral therewith a lever 10, which projects outward beyond the periphery of the casing and is designed to be engaged by a tappet 11, mounted to swing on a plate 11, attached, as here shown, to the rim of the wheel. When the vehicle is going forward, the tappet 11 will engage against a lug 13 on the plate 12, so as to impart movement to the lever, as will be hereinafter described. Should the vehicle be moved backward, however, the tappet will swing against a lug 14 on the opposite side of the plate 12,-as indicated by dotted lines in Fig. 6, thus preventing any possible breaking of the indicator mechanism.

Attached to the spindle 9 within the casing is a ratchet-wheel 15, designed to be engaged by a pawl 16, pivoted in the casing. A spiral spring 17 has one end secured to the pawl 16 and the other end secured to the spindle 9. A short shaft 18 extends through the bottom of the casing, and at its inner end this shaft is provided with an eccentric pin 19, designed to engage with one arm of the pawl 16 to release the pawl from the ratchet-wheel. On the lower end of this shaft 18 is a four-armed wheel 20.

In the operation, when the vehicle is in motion, the tappet 11 will strike the lever 10 and by the impact force the lever a certain distance, and consequently the pointer 8 is carried around, indicating on the dial the speed. Of course the faster the vehicle is moving the greater distance the pointer will be thrown. The pawl 16, by engaging with the ratchet-wheel, will hold the pointer in its position. Before the tappet strikes the lever 10 it will strike one of the arms of the wheel 20, releasing the pawl to engage the ratchet-wheel 15. The next two turns of the bicycle-wheel merely turn the wheel 20, but at the fourth turn the tappet, by engaging the next arm of the series on the wheel 20, will cause the pin 19 to engage the pawl 16, moving it out of engagement with the ratchet-wheel, so that the spring 17 will return the lever 10 to its original or normal position, and it will be stopped at this position by means of a pin 21.

Having thus described my invention, I claim as new and desire to secure by Letters Patent—

1. A speed-indicator for vehicles, comprising a casing, a dial in said casing, a pointer movable over the dial, a spindle on which the pointer is mounted, a lever integral with the spindle and adapted to be engaged by a part carried by a wheel of the vehicle, a ratchet-wheel on the spindle within the casing, a pawl for engaging with the ratchet-wheel, a coiled-spring connection between the pawl and spindle and a radial arm-wheel adapted to be engaged by said part carried by the vehicle-wheel and operating to release the pawl from the ratchet-wheel.

2. A speed-indicator comprising a casing, a dial in the casing, a glass over the dial, a pointer movable over the dial, a spindle on which the pointer is mounted, a lever integral with the outer end of said spindle, a part carried by a wheel of the vehicle for engaging with said lever, a ratchet-wheel on the spindle within the casing, a pawl in the casing for engaging with said ratchet-wheel, a coiled-spring connection between said pawl and spindle, a shaft extended through the bottom wall of the casing, a pin eccentrically arranged on the inner end of said shaft, and a wheel on the shaft and having a plurality of radial arms adapted to be engaged by said part carried by the vehicle-wheel.

3. A speed-indicator comprising a casing, means for securing the casing to a fixed portion of a vehicle, a dial in the casing, a pointer movable over the dial, a spindle on which the pointer is mounted, a lever on the outer end of the spindle, a ratchet-wheel on the spindle within the casing, a pawl for engaging with said ratchet-wheel, a coiled-spring connection between said pawl and the spindle, a shaft extended through the bottom wall of the casing, a pin eccentrically arranged on the inner end of said shaft for engaging with said pawl, a wheel having radial arms attached to the outer end of said shaft, a pin on the casing for stopping the lever at normal position, and a swinging tappet adapted to be attached to a vehicle-wheel for engaging with the wheel on the short shaft and also for engaging with said lever.

In testimony whereof I have signed my name to this specification in the presence of two subscribing witnesses.

HENRY ANDREWS.

Witnesses:
H. C. ANDERSEN,
M. V. LOY.